United States Patent Office 3,230,211
Patented Jan. 18, 1966

---

3,230,211
8-p-FLUORO-L-PHENYLALANYL BRADYKININ
Ernest D. Nicolaides, Ann Arbor, Mich., assignor to Parke, Davis & Company, Detroit, Mich., a corporation of Michigan
No Drawing. Filed Sept. 26, 1962, Ser. No. 226,462
3 Claims. (Cl. 260—112.5)

This invention relates to a new fluorinated polypeptide and to methods for producing the same. More particularly, the invention relates to 8-p-fluoro-L-phenylalanyl bradykinin, a novel synthetic nonapeptide having the following formula,

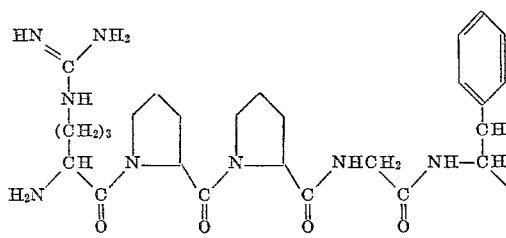 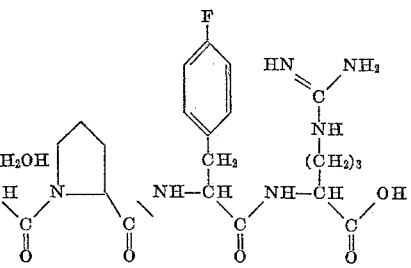

and to salts thereof. Expressed in another manner, the compound of the invention in free amino acid form may be defined as L-arginyl-L-prolyl-L-prolyl-glycyl-L-phenylalanyl - L - seryl - L - prolyl - p-fluoro-L-phenylalanyl-L-arginine.

According to the invention, the new fluorinated polypeptide and its acid-addition salts can be prepared by the catalytic hydrogenation of dicarbobenzoxy-L-arginyl-L-prolyl - L - prolyl-glycyl-L-phenylalanyl-L-seryl-L-prolyl-p-fluoro-L-phenylalanyl-nitro-L-arginine, of L-arginyl-L-prolyl-L-prolyl-glycyl-L-phenylalanyl-L-seryl - L - prolyl-p-fluoro-L-phenylalanyl-nitro-L-arginine, or its acid-addition salts. The reduction can be carried out in a medium comprising a mixture of an acid, such as glacial acetic, hydrochloric, hydrobromic, or trifluoroacetic, and an organic solvent, such as methanol or a higher alcohol, dioxane, dimethylformamide, or mixtures of these. The preferred medium is a mixture of glacial acetic acid and methanol. In this medium the product is isolated as an acid-addition salt. If desired, the salt may be converted to the free amino acid by neutralization. The preferred catalyst for the reduction is palladium, although other noble metals may be used. The hydrogenation can be effected under a rather wide range of conditions. The pressure can be varied over the range of 15 to 65 pounds per square inch, with the preferred range being 15 to 18 pounds per square inch. It is convenient to effect the reduction at room temperature over a period of 24 hours. If desired, however, the temperature may be varied between 10 and 100° C. over a period of 2 to 48 hours.

Dicarbobenzoxy-L-arginyl-L-prolyl-L-prolyl - glycyl-L-phenylalanyl-L-seryl-L-prolyl-p-fluoro-L-phenyl - alanyl-nitro-L-arginine, as well as L-arginyl-L-prolyl-L-prolyl-glycyl-L-phenylalanyl-L-seryl-L-prolyl-p-fluoro - L - phenylalanyl-nitro-L-arginine, and its acid-addition salts, which are the compounds reduced to produce the compounds of the invention, have not previously been known and can be prepared by methods well known in the art for the synthesis of polypeptides and polypeptide derivatives. The dicarbobenzoxy-nitro-nonapeptide can be prepared according to a reaction sequence comprising the separate preparation of a dipeptide derivative, carbobenzoxy-p-fluoro-L-phenylalanyl-nitro-L-arginine methyl ester, of a tripeptide derivative, carbobenzoxy-L-prolyl-p-fluoro-L-phenylalanyl-nitro-arginine methyl ester, of a pentapeptide derivative, carbobenzoxy - L - phenylalanyl-L-seryl-L-prolyl-p-fluoro-L-phenylalanyl-nitro-L-arginine, of a hexapeptide derivative, carbobenzoxy-glycyl-L-phenylalanyl-L-seryl-L-prolyl-p-fluoro-L-phenylalanyl - nitro - L - arginine methyl ester, of a heptapeptide derivative, carbobenzoxy-L-prolyl-glycyl-L-phenylalanyl - L - seryl - L - prolyl-p-fluoro-L-phenylalanyl-nitro-L-arginine methyl ester, of an octapeptide derivative, carbobenzoxy-L-prolyl-L - prolyl-glycyl-L-phenylalanyl-L-seryl-L-prolyl-p-fluoro-L-phenylalanyl-nitro-L-arginine methyl ester, and, finally, of a nonapeptide derivative, tricarbobenzoxy-L-arginyl-L-prolyl-L-prolyl-glycyl-L-phenylalanyl - L - seryl - L - prolyl-p-fluoro-L-phenylalanyl-nitro-L-arginine methyl ester, which can be converted to the starting material employed in the practice of this invention by reaction with aqueous alkali, followed by treatment with hydrochloric acid to precipitate dicarbobenzoxy-L-arginyl-L-prolyl-L-prolyl-glycyl-L-phenylalanyl-L-seryl-L-prolyl - p - fluoro-L - phenylalanyl-nitro-L-arginine. The dihydrobromide salt of L-arginyl-L-prolyl-L-prolyl-glycyl-L-phenylalanyl-L - seryl-L-prolyl-p-fluoro-L-phenylalanyl-nitro-L-arginine can be prepared by allowing discarbobenzoxy-L-arginyl-L-prolyl-L-prolyl-glycyl-L-phenylalanyl - L - seryl - L - prolyl-p-fluoro-L-phenylalanyl-nitro-L-arginine to react with gaseous hydrogen bromide in glacial acetic acid solution, and precipitating the salt by addition of ether. The corresponding free amino acid can be obtained by neutralization of the dihydrobromide salt with ammonia in aqueous solution, followed by lyophilization.

The free amino acid of the invention, L-arginyl-L-prolyl-L-prolyl-glycyl - L - phenylalanyl - L - seryl - L - prolyl-p-fluoro-L-phenylalanyl-L-arginine, forms acid-addition salts with a variety of inorganic and organic acids. Nontoxic salts are formed by reaction of the free amino acid with such acids as hydrochloric, hydrobromic, hydriodic, sulfuric, acetic, trifluoroacetic, benzoic, citric, and related acids. The acid-addition salts can be converted to the free amino acid by reaction with a base such as aqueous ammonia. The free amino acid of the invention also forms carboxylate salts by reaction with alkali metal and alkaline earth metal hydroxides. Pharmaceutically-acceptable salts are the sodium, potassium, calcium, and other similar salts. In the applications of this invention, either the free amino acid or its salts can be employed.

The compounds of this invention are useful pharmacological agents. They are potent vasodilators and hypotensive agents. In this respect they are more potent than naturally-occurring bradykinin, and maintain their activity over a longer period of time. They are active upon parenteral administration. The compounds of the invention are also bronchoconstricting agents, and can be used as laboratory tools in determining bronchodilator activity.

The invention is illustrated by the following examples:

*Example 1*

To a solution of 200 mg. of dicarbobenzoxy-L-arginyl-L-prolyl - L - proly-glycyl - L - phenylalanyl-L-seryl-L-prolyl-p-fluoro-L-phenylalanyl-nitro-L-arginine in a mixture of 25 ml. of glacial acetic acid and 20 ml. of methanol is added 500 mg. of palladium black. The mixture is shaken with hydrogen under a pressure of 17 to 18 pounds per square inch at room temperature for a period of 24 hours. The catalyst is removed by filtration and the solvent mixture is removed from the filtrate by vacuum distillation to obtain an oil, which is somewhat impure L-arginyl-L-prolyl-L-prolyl-glycyl-L-phenylalanyl-L-seryl-L-prolyl-p-fluoro-L-phenylalanyl-L-arginine triacetate. The oil is dissolved in 75 ml. of water, the aqueous solution is shell-frozen and lyophilized to obtain the desired L-arginyl-L-prolyl-L-prolyl-glycyl-L-phenylalanyl-L-seryl-L-prolyl-p-fluoro - L - phenylalanyl-L-arginine triacetate, a white solid, M.P. 160–165° C. The free amino acid is obtained by treating the triacetate with 3 equivalents of ammonia in aqueous solution, followed by lyophilization to remove the volatile ammonium acetate. A hydrobromide salt is obtained by adding a slight excess of hydrogen bromide to a solution of the free base in ether. The free amino acid is converted to the sodium salt by reaction with an equivalent amount of sodium hydroxide in aqueous solution.

Example 2

To a solution of 200 mg. of dicarbobenzoxy-L-arginyl-L-prolyl - L - prolyl-glycyl - L - phenylalanyl - L - seryl-L-prolyl-p-fluoro-L-phenylalanyl-nitro-L-arginine in 25 ml. of glacial acetic acid is added 3 g. of dry hydrogen bromide. The solution is allowed to stand at room temperature for two hours, and 200 ml. of ether is added to precipitate the dihydrobromide salt of L-arginyl-L-prolyl - L - prolyl-glycyl - L - phenylalanyl - L - seryl-L-prolyl-p-fluoro-L-phenylalanyl-nitro-L-arginine. The dihydrobromide salt is collected, dried in vacuo, and the dried salt is dissolved in a mixture of 25 ml. of glacial acetic acid and 20 ml. of methanol. Palladium black (500 mg.) is added to the solution, and the mixture is shaken with hydrogen under a pressure of 17 to 18 pounds per square inch at room temperature for a period of 24 hours. The catalyst is removed by filtration and the solvent mixture is removed from the filtrate by vacuum distillation to obtain an oil, which is somewhat impure L-arginyl-L-prolyl-L-prolyl-glycyl-L-phenylalanyl-L-seryl-L-prolyl-p-fluoro - L - phenylalanyl-L-arginine triacetate. The oil is dissolved in 75 ml. of water, the aqueous solution is shell-frozen and lyophilized to obtain the desired triacetate, a white solid, identical with that described in Example 1.

The dicarbobenzoxy-L-arginyl-L-prolyl-L-prolyl-glycyl-L-phenylalanyl-L-seryl-L-prolyl-p - fluoro-L-phenylalanyl-nitro-L-arginine, employed as starting material, can be obtained in a series of stages as follows.

*Stage 1.*—A solution of 20 g. of carbobenzoxy-p-fluoro-L-phenylalanine and 8.8 g. of p-nitrophenol in 300 ml. of ethyl acetate is cooled to 5° C., and 13 g. of dicyclohexylcarbodiimide is added. The solution is allowed to stand at 5° C. for 2 hours. It is then purified by filtration, and the filtrate is diluted with a mixture of ether and petroleum ether to precipitate carbobenzoxy-p-fluoro-L-phenylalanine-p-nitrophenyl ester, which can be recrystallized from a mixture of ethyl acetate and ether as white needles; M.P. 137–138° C.; $[\alpha]_D^{23}$ —29.6° (1% in methanol).

*Stage 2.*—A solution of 13 g. of nitro-L-arginine methyl ester hydrochloride in 100 ml. of dimethylformamide is cooled to 5° C. and 5.5 g. of triethylamine is added. After filtration, 22 g. of carbobenzoxy-p-fluoro-L-phenylalanine-p-nitrophenyl ester is added to the filtrate, and the resulting solution is kept at room temperature for 24 hours. Ethyl acetate (300 ml.) is added, and the solution is washed successively with water, dilute sodium carbonate solution, water, dilute hydrochloric acid, and water. After drying over anhydrous magnesium sulfate, the solution is concentrated to a volume of 50 ml., and diluted with ether to precipitate carbobenzoxy-p-fluoro-L-phenylalanyl-nitro-L-arginine methyl ester, a white solid, which can be recrystallized from a mixture of methanol and ether; M.P. 94–97° C.; $[\alpha]_D^{23}$ —11° (1% in methanol).

*Stage 3.*—To a solution of 20 g. of carbobenzoxy-p-fluoro-L-phenylalanyl-nitro-L-arginine methyl ester in 100 ml. of glacial acetic acid is added 20 g. of gaseous hydrogen bromide. After one hour at room temperature, the solution is poured into 1000 ml. of dry ether, and the precipitated hydrobromide salt of p-fluoro-L-phenylalanyl-nitro-L-arginine methyl ester is collected and dried in vacuo. The dried hydrobromide salt is dissolved in 100 ml. of dimethylformamide, the solution is cooled to 5° C., and 8 g. of triethylamine is added. The resulting precipitate is removed by filtration, and to the filtrate is added 15 g. of carbobenzoxy-L-proline-p-nitrophenyl ester. After standing overnight at room temperature, the reaction mixture is concentrated to one-third its original volume and diluted with ether to precipitate carbobenzoxy - L - prolyl-p-fluoro - L - phenylalanyl-nitro-L-arginine methyl ester, which can be recrystallized from a methanol-ether mixture; M.P. 95–98° C.; $[\alpha]_D^{23}$ —54.7° (2.2% in methanol).

*Stage 4.*—To a solution of 13 g. of carbobenzoxy-L-phenylalanyl-L-serine hydrazide dissolved in a mixture of 100 ml. of glacial acetic acid and 25 ml. of 2 N. hydrochloric acid maintained at 0° C. is added 2.5 g. of sodium nitrite. After 5 minutes, the solution is diluted with 500 ml. of ice-cold water, and the resulting mixture is extracted with ice-cold ethyl acetate. The ethyl acetate solution is washed first with ice-cold water and then with ice-cold aqueous sodium bicarbonate solution until it is neutral. The neutral ethyl acetate solution containing carbobenzoxy - L - phenylalanyl-L-serine azide is then dried over anhydrous magnesium sulfate.

In a separate procedure, 18 g. of carbobenzoxy-L-prolyl-p-fluoro - L - phenylalanyl-nitro-L-arginine methyl ester is treated with 20 g. of gaseous hydrogen bromide in 150 ml. of glacial acetic acid for 2 hours at room temperature. The solution is poured into ether, the precipitate is collected and dried in vacuo to obtain the hydrobromide salt of L-prolyl-p-fluoro-L-phenylalanyl-nitro-L-arginine methyl ester.

The dried hydrobromide salt is dissolved in 50 ml. of dimethylformamide, the solution is cooled to 0° C. and 10 g. of triethylamine is added. After filtration, the filtrate is added to the previously prepared solution of carbobenzoxy-L-phenylalanyl-L-serine azide in ethyl acetate, and the resulting solution is kept at 5° C. for 2 days. The solution is then washed successively with water, dilute aqueous sodium bicarbonate solution, water, dilute hydrochloric acid, and water. After drying, the solution is concentrated to 50 ml. and ether is added to give a white solid, which is carbobenzoxy-L-phenylalanyl-L-seryl-L-prolyl-p-fluoro-L-phenylalanyl - nitro-L-arginine methyl ester; M.P. 148–159° C.; $[\alpha]_D^{23}$ —41.8° (1% in dimethylformamide).

*Stage 5.*—To a solution of 10 g. of carbobenzoxy-L-phenylalanyl - L - seryl - L - prolyl - p - fluoro-L-phenylalanyl-nitro-L-arginine methyl ester in 75 ml. of glacial acetic acid is added 8 g. of gaseous hydrogen bromide. After 1½ hours at room temperature, the solution is poured into 1000 ml. of dry ether, and the precipitated hydrobromide salt is collected and dried in vacuo. The dried salt is dissolved in 75 ml. of dimethylformamide, the solution is cooled to 5° C., and 3.5 g. of triethylamine is added. After filtration, 4.3 g. of carbobenzoxy-glycine-p-nitrophenyl ester is added to the filtrate, the resulting solution is kept at room temperature for 16 hours, concentrated to 25 ml. and diluted with ether to precipitate carbobenzoxy - glycyl - L - phenylalanyl-L-seryl-L-prolyl-p-fluoro-L-phenylalanyl-nitro-L-arginine methyl ester, which can be recrystallized from methanol; M.P. 226–228° C.; $[\alpha]_D^{23}$ —50° (1% in dimethylformamide).

*Stage 6.*—To a solution of 7.5 g. of carbobenzoxy-glycyl-L-phenylalanyl-L-seryl-L-prolyl - p - fluoro - L - phenylalanyl-nitro-L - arginine methyl ester in 50 ml.

glacial acetic acid is added 10 g. of gaseous hydrogen bromide. After 2 hours at room temperature, the solution is poured into 1000 ml. of dry ether, and the precipitated hydrobromide salt is collected and dried in vacuo. The dried salt is dissolved in 50 ml. of dimethylformamide at 5° C., 3 g. of triethylamine is added, and, after filtration, 3.5 g. of carbobenzoxy-L-proline-p-nitrophenyl ester is added to the filtrate. The resulting solution is kept at room temperature for 48 hours, concentrated to 25 ml., and diluted with ether to precipitate carbobenzoxy-L-prolyl-glycyl-L-phenylalanyl - L - seryl-L - prolyl-p-fluoro-L-phenylalanyl-nitro-L-arginine methyl ester; M.P. 195–197° C.; $[\alpha]_D^{23}$ —58.7° (1% in dimethylformamide).

*Stage 7.*—In an entirely analogous manner to that described in Stage 6 above, the heptapeptide derivative of that stage is converted by condensation of the hydrobromide salt with carbobenzoxy-L-proline-p-nitro-phenyl ester to carbobenzoxy-L-proyl-L-prolyl-glycyl-L-phenylalanyl-L-seryl-L-prolyl-p-fluoro-L-phenylalanyl - nitro-L-arginine methyl ester, which is recrystallized from a mixture of methanol and ethyl acetate; M.P. 166–168° C.; $[\alpha]_D^{23}$ —67.5° (1% in dimethylformamide).

*Stage 8.*—To a solution of 5 g. of the octapeptide derivative of Stage 7 in 50 ml. of glacial acetic acid is added 6 g. of gaseous hydrogen bromide. After 2 hours at room temperature, the solution is poured into ether, and the hydrobromide salt of L-prolyl-L-prolyl-glycyl - L-phenylalanyl-L-seryl-L-prolyl-p-fluoro - L - phenylalanyl-nitro-L-arginine methyl ester is collected and dried in vacuo. The dried solid (2.5 g.) is dissolved in 50 ml. of dimethylformamide at 5° C., 1 g. of triethylamine is added, and, after filtration, 1.5 g. of tricarbobenzoxy-L-arginine-p-nitrophenyl ester is added to the filtrate. The resulting solution is kept at room temperature for 2 days, concentrated to 10 ml., and diluted with ether to precipitate tricarbobenzoxy-L-arginyl-L-prolyl-L - prolyl-glycyl-L-phenylalanyl-L-seryl-L-prolyl - p - fluoro - L-phenylalanyl-nitro-L-arginine methyl ester, which is collected and then washed first with ether, then with warm ethyl acetate, and is recrystallized from a mixture of ethanol and ethyl acetate; M.P. 145–147° C.; $[\alpha]_D^{23}$ —47.5° (1% in dimethylformamide).

*Stage 9.*—A solution containing 2 g. of the nonapeptide derivative of Stage 8 and 1.6 g. of 2 N sodium hydroxide in 30 ml. of methanol is stirred at room temperature for 1 hour. To this solution is added 50 ml. of water and 2.6 ml. of 2 N hydrochloric acid. The precipitated dicarbobenzoxy-L-arginyl - L - prolyl - L - prolyl - glycyl-L-phenylalanyl-L-seryl-L-prolyl-p - fluoro - L - phenylalanyl-nitro-L-arginine is collected and recrystallized twice from a mixture of methanol and ethyl acetate; M.P. 155–160° C.; $[\alpha]_D^{23}$ —62.5° (1% in methanol).

I claim:
1. A member of the class consisting of the nonapeptide, L-arginyl-L-prolyl-L-prolyl-glycyl-L - phenylalanyl - L-seryl - L - prolyl - p - fluoro - L - phenylalanyl - L-arginine, and pharmaceutically-acceptable salts thereof.

2. L - Arginyl - L - prolyl - L - prolyl - glycyl - L-phenylalanyl - L - seryl - L - prolyl - p - fluoro - L-phenylalanyl-L-arginine.

3. L - Arginyl - L - prolyl - L - prolyl - glycyl - L-phenylalanyl - L - seryl - L - prolyl - p - fluoro-L-phenylalanyl-L-arginine triacetate.

References Cited by the Examiner

Nicolaides et al.: Synthesis of Polypeptides, Bradykinin, J. Org. Chem, 26, pp. 3872–76 (1961).

WILLIAM H. SHORT, *Primary Examiner.*

LEON J. BERCOVITZ, *Examiner.*